(12) United States Patent  (10) Patent No.: US 9,356,413 B2
Kubo  (45) Date of Patent: May 31, 2016

(54) LASER SOURCE APPARATUS AND LASER MICROSCOPE

(71) Applicant: Olympus Corporation, Tokyo (JP)

(72) Inventor: Hirokazu Kubo, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 13/625,228

(22) Filed: Sep. 24, 2012

(65) Prior Publication Data

US 2013/0083816 A1  Apr. 4, 2013

(30) Foreign Application Priority Data

Sep. 30, 2011  (JP) ................................. 2011-217160

(51) Int. Cl.
| | |
|---|---|
| *H01S 3/00* | (2006.01) |
| *G02B 21/00* | (2006.01) |
| *G02F 1/35* | (2006.01) |
| *G02F 1/39* | (2006.01) |

(52) U.S. Cl.
CPC .......... *H01S 3/0057* (2013.01); *G02B 21/0032* (2013.01); *G02B 21/0076* (2013.01); *G02F 1/3532* (2013.01); *G02F 1/39* (2013.01); *G02B 2207/114* (2013.01); *H01S 3/0092* (2013.01)

(58) Field of Classification Search
CPC . H01S 3/08004; H01S 3/08009; H01S 3/092; H01S 3/10; H01S 3/10023; H01S 3/1003; H01S 3/0057; G02F 1/39; G01F 1/3532; G02B 2207/114; G02B 21/0032

USPC .................................... 372/21, 22; 250/492.1
See application file for complete search history.

(56) References Cited

U.S. PATENT DOCUMENTS

| | | | |
|---|---|---|---|
| 2002/0063220 A1 | 5/2002 | Engelhardt et al. | |
| 2005/0078363 A1* | 4/2005 | Gugel | 359/385 |
| 2007/0133086 A1* | 6/2007 | Wilhelm et al. | 359/385 |
| 2009/0290150 A1* | 11/2009 | Takimoto et al. | 356/301 |
| 2011/0180729 A1* | 7/2011 | Kafka et al. | 250/492.1 |

OTHER PUBLICATIONS

Ahn et al., "Harmonic Phase-Dispersion Microscope with a Mach-Zehnder Interferometer," Mar. 1, 2005, Applied Optics, vol. 44, No. 7, 1188-1190.*

* cited by examiner

*Primary Examiner* — Joshua King
(74) *Attorney, Agent, or Firm* — Holtz, Holtz & Volek PC

(57) ABSTRACT

Provided is a laser source apparatus including a single laser source that emits an ultrashort-pulse laser beam; a wavelength conversion mechanism that generates a plurality of pulsed laser beams having different wavelengths by converting at least a part of wavelength of the ultrashort-pulse laser beam; a dispersion adjusting section that adjusts the amount of frequency dispersion for each of the pulsed laser beams; and an introducing optics that emits the plurality of pulsed laser beams whose frequency dispersion amounts are adjusted by the dispersion adjusting section. The dispersion adjusting section adjusts the amount of frequency dispersion for each of the pulsed laser beams so that each of the pulsed laser beams introduced to the irradiation optics of the optical apparatus from the introducing optics to excite a specimen is close to a substantially Fourier-transform-limited pulse.

23 Claims, 11 Drawing Sheets

LASER SOURCE APPARATUS AND LASER MICROSCOPE

CROSS-REFERENCE TO RELATED APPLICATIONS

This application is based on Japanese Patent Application No. 2011-217160, the content of which is incorporated herein by reference.

TECHNICAL FIELD

The present invention relates to a laser source apparatus and a laser microscope.

BACKGROUND ART

In the related art, there is a known laser source apparatus for laser microscope that generates laser beams having a plurality of wavelengths by splitting a laser beam having a single wavelength emitted from a single laser source into two beams and converting one wavelength of these laser beams with an optical parametric oscillator (OPO) (for example, see Patent Literature 1 and Patent Literature 2).

Compared with a laser source apparatus using a plurality of sources, this kind of laser source apparatus has superior timing control among the plurality of laser beams particularly when using pulsed laser with an extremely short pulse width, such as femtosecond-pulse laser or picosecond-pulse laser. Therefore, it is suitable for using ultrashort-pulse laser beams having a plurality of wavelengths for simultaneously observing a plurality of fluorescences from a multi-colored specimen or for simultaneously performing light stimulation and observation. In addition, laser beams having a plurality of wavelengths can be used with a low-cost configuration compared with an apparatus equipped with a plurality of laser sources.

CITATION LIST

Patent Literature

{PTL 1}
U.S. Patent Application Publication No. 2002/0063220
{PTL 2}
U.S. Patent Application Publication No. 2005/0078363

SUMMARY OF INVENTION

Technical Problem

To achieve sufficient wavelength conversion efficiency using an OPO, it is necessary to make the laser beam that is incident on the OPO a substantially Fourier-transform-limited pulse so as to increase the power density. Therefore, the wavelength-converted laser beam outputted from the OPO is also close to a Fourier-transform-limited pulse. When such a laser beam is guided directly to a laser microscope and irradiates a specimen, the pulse width of the laser beam becomes wider than the substantially Fourier-transform-limited pulse width due to frequency dispersion possessed by an objective lens and other optical elements disposed at intermediate positions in the light path.

Solution to Problem

A first aspect of the present invention is a laser source apparatus for introducing a plurality of ultrashort-pulse laser beams having different wavelengths to an optical apparatus provided with an irradiation optics that excites a specimen with the plurality of ultrashort-pulse laser beams and that performs an operation on the specimen with the plurality of ultrashort-pulse laser beams, the laser source apparatus including a single laser source that emits an ultrashort-pulse laser beam; a wavelength conversion mechanism that generates a plurality of pulsed laser beams having different wavelengths by converting at least a part of wavelength of the ultrashort-pulse laser beam emitted from the laser source; a dispersion adjusting section that adjusts the amount of frequency dispersion for each of the pulsed laser beams generated by the wavelength conversion mechanism; and an introducing optics that emits the plurality of pulsed laser beams whose frequency dispersion amounts are adjusted by the dispersion adjusting section, wherein the dispersion adjusting section adjusts the amount of frequency dispersion for each of the pulsed laser beams so that each of the pulsed laser beams introduced to the irradiation optics of the optical apparatus from the introducing optics is close to a substantially Fourier-transform-limited pulse at the specimen.

A second aspect of the present invention is a laser microscope including the above-described laser source apparatus; and an irradiation optics to which the combined pulsed laser beams emitted from the introducing optics are introduced and which excites the specimen with the pulsed laser beams.

Advantageous Effects of Invention

The present invention affords an advantage in that it is possible to generate laser beams having a plurality of wavelengths from a single laser beam and to generate a multiphoton excitation effect with high efficiency with each laser beam.

DESCRIPTION OF EMBODIMENTS

A laser source apparatus 1 according to a first embodiment of the present invention will be described below with reference to FIGS. 1 and 2.

Figure 1:
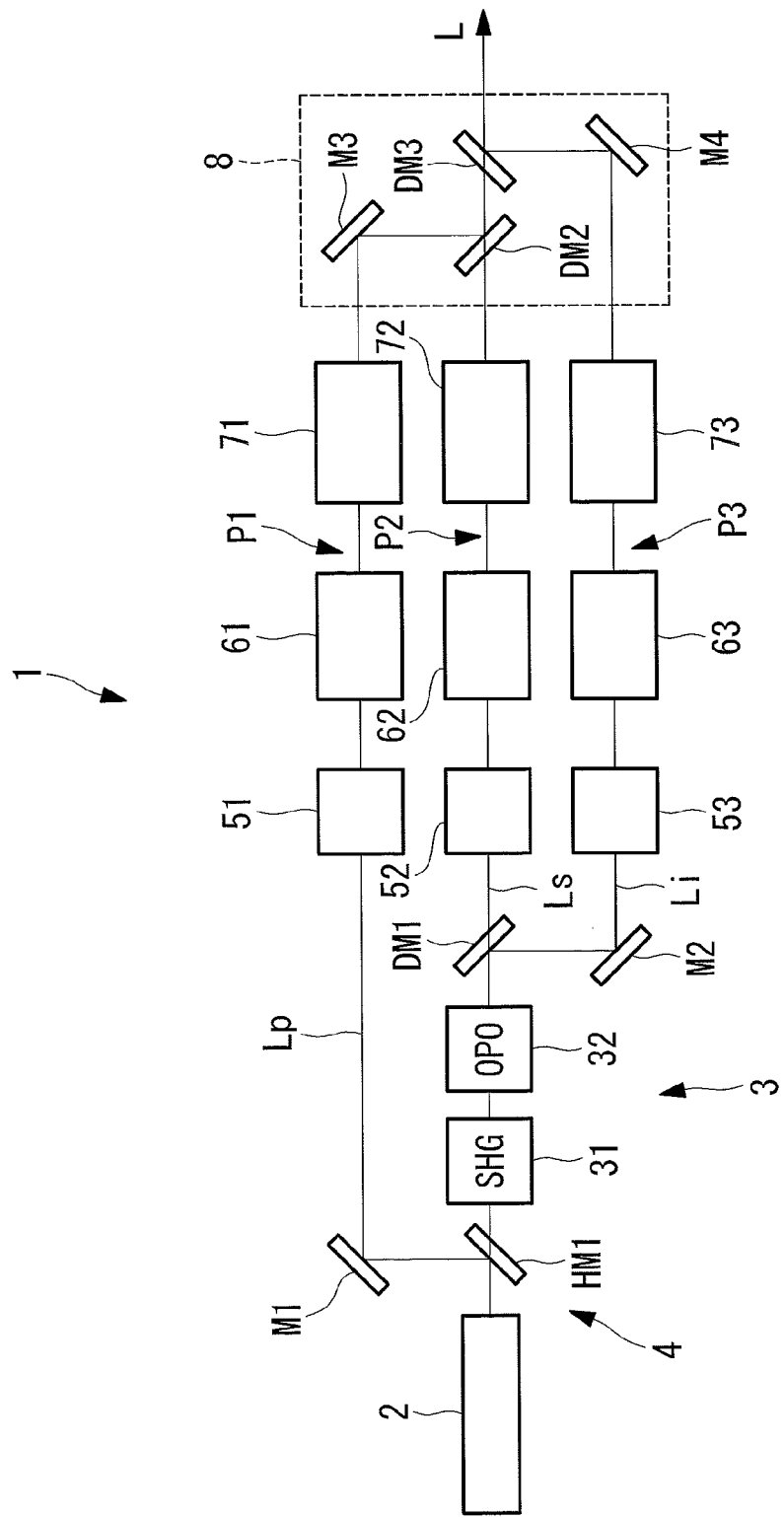
FIG. 1 is a diagram showing the overall configuration of a laser source apparatus according to a first embodiment of the present invention.

As shown in FIG. 1, the laser source apparatus 1 according to this embodiment includes a single laser source 2 that emits a femtosecond-pulse laser beam (ultrashort-pulse laser beam), a wavelength conversion unit (wavelength conversion mechanism) 3 that converts the wavelength of the femtosecond-pulse laser beam from the laser source (hereinafter referred to as pump laser beam Lp) to generate two pulsed laser beams with different wavelengths (hereinafter referred to as signal laser beam Ls and idler laser beam Li), a splitting part 4 that splits the three pulsed laser beams Lp, Ls, and Li into first to third light paths P1 to P3, dispersion-compensating optics (dispersion adjusting sections) 51 to 53, power modulators 61 to 63, and optics for beam-shaping 71 to 73 disposed in the respective light paths P1 to P3, and an introducing optics 8 that combines the pulsed laser beams Lp, Ls, and Li guided via the three light paths P1 to P3 and emits combined light.

The wavelength conversion unit 3 includes a device 31 to induce a second harmonic generation (SHG) and an optical parametric oscillator (OPO) 32 serving as a wavelength conversion device.

The SHG device 31 induces a second harmonic generation of the pump laser beam Lp from the incident pump laser beam Lp and outputs it.

The OPO 32 converts the wavelength of the second harmonic generation of the pump laser beam Lp outputted from the SHG device 31 to a difference frequency to generate the signal laser beam Ls and the idler laser beam Li having different wavelengths. The second harmonic frequency $\omega 1$ of the pump laser beam Lp, and the frequency $\omega 2$ of the signal laser beam Ls and the frequency $\omega 3$ ($\omega 3 < \omega 2$) of the idler light output from the OPO 32 satisfy the relationship $\omega 1 = \omega 2 + \omega 3$.

The splitting part 4 includes a half-mirror (splitting device, wavelength conversion mechanism) HM1 disposed directly after the laser source 2 and a dichroic mirror DM1 disposed so that the dichroic mirror DM1 and the half-mirror HM1 flank the SHG device 31 and the OPO 32. The half-mirror HM1 is a mirror that reflects part of the light incident thereon while transmitting the rest, and the ratio of the intensities of the reflected light and the transmitted light is appropriately designed.

Half of the pump laser beam Lp from the laser source 2 is guided along the first light path P1 upon being reflected by the half-mirror HM1. The other half of the pump laser beam Lp passes through the half-mirror HM1 to be incident on the SHG device 31 and is emitted from the OPO 32 as the signal laser beam Ls and the idler laser beam Li. Then, the signal laser beam Ls passes through the dichroic mirror DM1 and is guided along the second light path P2, and the idler laser beam Li is reflected by the dichroic mirror DM1 and is guided along the third light path P3. Reference signs M1 and M2 are mirrors that deflect the pump laser beam Lp reflected by the half-mirror HM1 and the idler laser beam Li reflected by the dichroic mirror DM1, respectively.

The dispersion-compensating optics 51 to 53 apply negative frequency dispersion to the incident pulsed laser beams Lp, Ls, and Li, respectively. The amounts of frequency dispersion that the dispersion-compensating optics 51 to 53 apply to the respective pulsed laser beams Lp, Ls, and Li are determined according to the frequency dispersion of an irradiation optics 21 provided in a microscope unit 20 that is combined with the laser source apparatus 1, as described later. For example, prism pairs, grating pairs, or chirped mirrors can be used as the dispersion-compensating optics 51 to 53.

The power modulators 61 to 63 are, for example, acousto-optic modulators (AOMs) or electro-optic modulators (EOMs). The power modulators 61 to 63 modulate the powers of the incident pulsed laser beams Lp, Ls, and Li, respectively, to prescribed magnitudes and output the modulated beams. In addition, the power modulators 61 to 63 control the output timings of these three pulsed laser beams Lp, Ls, and Li by turning the output powers of the respective pulsed laser beams Lp, Ls, and Li on and off, as described later.

The beam-shaping optics 71 to 73 shape the beam diameters and wavefront shapes of the incident pulsed laser beams Lp, Ls, and Li, respectively, so as to be suitable for the entrance pupil of an objective lens 25 (described later), and output the shaped beams.

The introducing optics 8 is formed of mirrors M3 and M4, one of each being disposed in two of the light paths, and two dichroic mirrors DM2 and DM3 disposed in the remaining light path. In the illustrated example, the mirrors M3 and M4 are disposed in the first light path P1 and the third light path P3, respectively, and the dichroic mirrors DM2 and DM3 are disposed in the second light path P2. The pump laser beam Lp and the idler laser beam Li are deflected towards the second light path P2 by the mirrors M3 and M4, respectively. The dichroic mirror DM2 at the front reflects the deflected pump laser beam Lp onto an extension of the second light path P2 and transmits the signal laser beam Ls. The dichroic mirror DM3 at the rear reflects the idler laser beam Li onto an extension of the second light path P2 and transmits the signal laser beam Ls and the pump laser beam Lp. In this way, the three pulsed laser beams Lp, Ls, and Li are combined on the extension of the second light path P2 and are emitted outside as combined light L.

Next, an embodiment of a laser microscope 100 provided with the thus-configured laser source apparatus 1 will be described.

Figure 2:
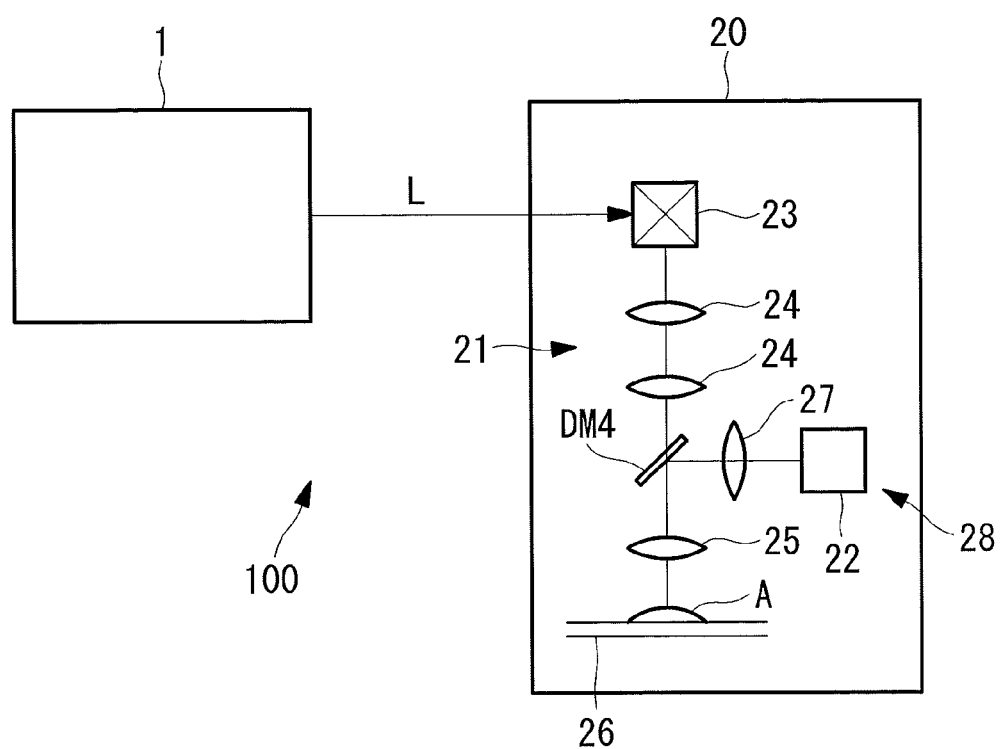
FIG. 2 is a diagram showing the overall configuration of a laser microscope according to the first embodiment of the present invention.

The laser microscope 100 according to this embodiment is used for observing a plurality of types of fluorescence in a specimen by utilizing a multiphoton excitation effect due to a plurality of ultrashort-pulse laser beams with different wavelengths and, as shown in FIG. 2, includes the laser source apparatus 1 and the microscope unit (optical apparatus) 20.

The microscope unit 20 includes the irradiation optics 21, into which the combined light L emitted from the laser source apparatus 1 is introduced and which excites a specimen A with this combined light L, and a detection optics 28 that detects fluorescences generated in the specimen A by excitation with the combined light L. The irradiation optics 21 includes a scanner 23 for two-dimensionally raster scanning the introduced combined light L, a series of lens 24, and an objective lens 25 that focuses the combined light L scanned by the scanner 23 onto the specimen A to excite the specimen A and that also collects fluorescence coming from the specimen A. In the figure, reference sign 26 indicates a stage on which the specimen A is mounted, and reference sign DM4 indicates a dichroic mirror. The detection optics 28 includes a condensing lens 27 and a detector 22.

Next, the operation of the thus-configured laser source apparatus 1 and microscope 100 will be described.

First, when the laser source 2 is activated to emit a femtosecond-pulse laser beam, the femtosecond-pulse laser beam is split into two by the half-mirror HM1; one beam is guided along the first light path P1 as the pump laser beam Lp, and the wavelength of other beam is converted by the SHG device 31 and the OPO 32 to form the signal laser beam Ls and the idler laser beam Li. In other words, three pulsed laser beams with different wavelengths from each other are generated from the femtosecond-pulse laser beam by the half-mirror HM1 and the OPO 32. The signal laser beam Ls and the idler laser beam Li are split by the dichroic mirror DM1 and are guided along the second light path P2 and the third light path P3, respectively.

As for the pump laser beam Lp, while being guided along the first light path P1, the amount of frequency dispersion is adjusted by the dispersion-compensating optics 51, the output power is adjusted by the power modulator 61, and the beam diameter and wavefront shape are adjusted by the beam-shaping optics 71. Similarly for the signal laser beam Ls and the idler laser beam Li, while being guided along the respective light paths P2 and P3, the amounts of frequency dispersion, the output powers, and the beam diameters and wavefront shapes are adjusted by the dispersion compensating optics 52 and 53, the power modulators 62 and 63, and the beam-shaping optics 72 and 73, respectively.

The amounts of frequency dispersion that the dispersion-compensating optics 51 to 53 apply to the respective pulsed laser beams Lp, Ls, and Li are determined by the frequency dispersions possessed by the series of lens 24 and the objective lens 25 provided in the microscope unit 20. In other words, while the pulsed laser beams Lp, Ls, and Li pass through the series of lens 24 and the objective lens 25, the pulse widths of the passed beams become wider than the pulse widths of the entering beams due to the fact that the speeds at which they propagate differ depending on the wavelength contained in the respective pulsed laser beams Lp, Ls, and Li. The dispersion-compensating optics 51 to 53 apply negative frequency dispersions for cancelling out this pulse width widening to the respective pulsed laser beams Lp, Ls, and Li. Accordingly, the pulsed laser beams Lp, Ls, and Li are substantially Fourier-transform-limited pulses at the specimen A.

The pulsed laser beams Lp, Ls, and Li whose amounts of frequency dispersion have been adjusted are combined into one beam by the introducing optics 8 to form the combined light L. The combined light L is made to enter the microscope unit 20, and after being two-dimensionally scanned by the scanner 23, it is focused onto the specimen A via the series of lens 24 and the objective lens 25. Accordingly, fluorescences excited with the respective pulsed laser beams Lp, Ls, and Li are generated in the specimen A. After being collected by the objective lens 25, the fluorescences are then reflected by the dichroic mirror DM4 and are detected by the detector 22 via the condensing lens 27.

The power modulators 61 to 63 are synchronized with the scanning period of the scanner 23 and adjust the output timings of the pulsed laser beams Lp, Ls, and Li so that the pulsed laser beams Lp, Ls, and Li are sequentially switched each time the scanner 23 scans one line or one frame. Accordingly, because the fluorescences having a plurality of wavelengths are incident on the detector 22 in a time-division manner, it is possible to convert each fluorescence to a separate image using the single detector 22.

The intensities of the fluorescences detected by the detector 22 are stored in association with the coordinates of the focal position on the specimen A, for each of the pulsed laser beams Lp, Ls, and Li serving as excitation light. Thus, it is possible to obtain two-dimensional fluorescence images of the three kinds of fluorescence excited by the pulsed laser beams Lp, Ls, and Li having different excitation wavelengths.

Thus, with the laser source apparatus 1 and the laser microscope 100 according to this embodiment, because the amounts of frequency dispersion of the pulsed laser beams Lp, Ls, and Li introduced to the microscope unit 20 are adjusted so that pulsed laser beams Lp, Ls, and Li are substantially Fourier-transform-limited pulses at the specimen A, a multiphoton excitation effect is efficiently generated by each of the pulsed laser beams Lp, Ls, and Li, thus allowing clear fluorescence images to be obtained. In addition, damage to the specimen A due to excitation with the pulsed laser beams Lp, Ls, and Li can be suppressed to a minimum.

In this embodiment, a fluorescence image due to another pulsed laser beam may be observed by using one or two of the three pulsed laser beams Lp, Ls, and Li for laser stimulation of the specimen A. In this case, the power modulators 61 to 63 may control the output timings of the respective pulsed laser beams Lp, Ls, and Li so that the pulsed laser beam used for laser stimulation excites the specimen A at the same time as the pulsed laser beam used for fluorescence image observation.

Next, a laser source apparatus 1' according to a second embodiment of the present invention will be described with reference to FIGS. 3 to 11. In the description of this embodiment, structures that are identical to those in the first embodiment are assigned the same reference signs, and a description thereof is omitted.

Figure 3:
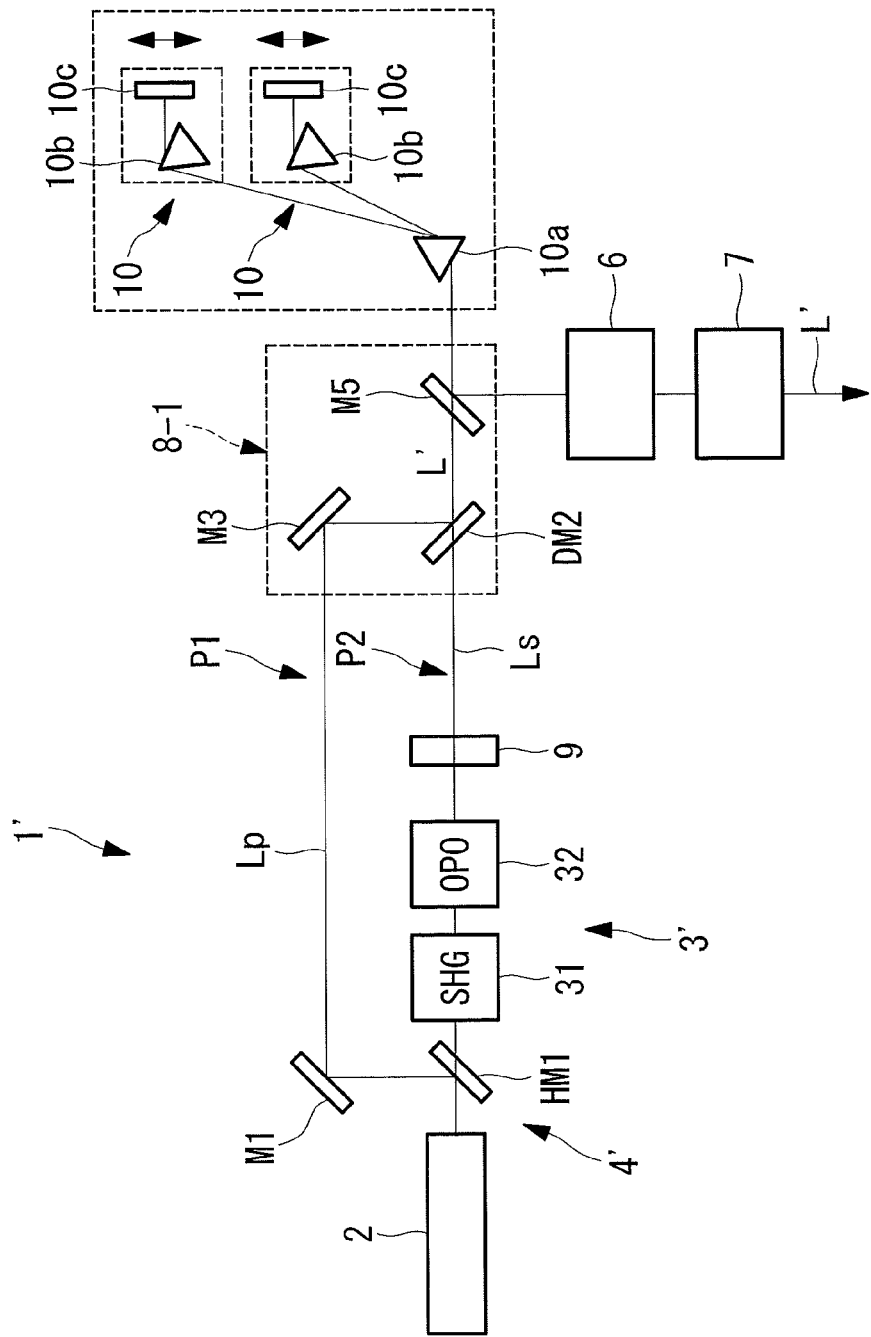
FIG. 3 is a diagram showing the overall configuration of a laser source apparatus according to a second embodiment of the present invention.

As shown in FIG. 3, the laser source apparatus 1' according to this embodiment differs from the first embodiment mainly in that two pulsed laser beams are externally emitted, the amounts of frequency dispersion are adjusted after these two pulsed laser beams are combined, and a power modulator and a beam-shaping optics are provided for combined light L'.

More specifically, a splitting part 4' is formed only of the half-mirror HM1, with the dichroic mirror DM1 in FIG. 1 being omitted, and in a wavelength conversion unit 3', a cut filter 9 that blocks one of the signal laser beam Ls and the idler laser beams Li (in this embodiment, the idler laser beam Li) outputted from the OPO 32 is provided after the OPO 32. The pump laser beam Lp guided along the first light path P1 and the signal laser beam Ls transmitted through the cut filter 9 and guided along the second light path P2 are combined by the dichroic mirror DM2 (combining portion) and the mirror M3 (combining portion) to form the combined light L', which enters the dispersion-compensating optics (dispersion adjusting section) 10.

One dispersion-compensating optics 10 is provided for each of the pulsed laser beams Lp and Ls and includes a first prism (frequency dispersion device) 10a that disperses the combined light L' into the pump laser beam Lp and the signal laser beam Ls, a second prism (frequency dispersion device) 10b, and a mirror 10c. The first prism 10a is shared by the two dispersion-compensating optics 10. The pulsed laser beams Lp and Ls passing through the first prism 10a pass through the second prisms 10b and are then reflected back by the mirrors 10c, whereupon they pass through the second prisms 10b and the first prism 10a again and return to the extension of the second light path P2.

The second prisms 10b and the mirrors 10c are moved as single units in the direction of the arrows to adjust the optical path lengths between the first prism 10a and the second prisms 10b, thereby allowing the amount of negative frequency dispersion applied to each of the pulsed laser beams Lp and Ls to be adjusted. Note that, instead of the first prism 10a and the second prisms 10b, diffraction gratings (not illustrated) may be used.

The pump laser beam Lp and the signal laser beam Ls that return to the second light path P2 are deflected by the mirror M5 to be incident on a power modulator 6. Note that, the height of the two combined beams L' (the position in a direction perpendicular to the plane of the drawing being referred to) is adjusted by, for example, the angles of the mirrors 10c so that the mirror M5 does not interfere with the combined light L' entering the dispersion-compensating optics 10.

The power modulator 6 is, for example, an acousto-optic tunable filter (AOTF). The power modulator 6 sequentially switches between the pump laser beam Lp and the signal laser beam Ls in synchronization with the scanning period of the scanner 23 and outputs the selected beam, like the power modulators 61 to 63 in the first embodiment. Note that the power modulator 6 can also output both the pump laser beam Lp and the signal laser beam Ls simultaneously, depending on the application. Also, an AOM may be used as the power modulator 6. In this case, by changing the modulation frequency, the AOM sequentially switches between the pump laser beam Lp and the signal laser beam Ls and outputs the selected beam.

The laser source apparatus 1' configured in this way can constitute a laser microscope together with the microscope unit 20 shown in FIG. 2, similarly to the first embodiment. In other words, in the laser microscope according to this embodiment, the laser source apparatus 1 in FIG. 2 is replaced with the laser source apparatus 1'.

With the thus-configured laser source apparatus 1' and the laser microscope according to this embodiment, the amounts of frequency dispersion are adjusted by the dispersion-compensating optics 10 so that the pulsed laser beams Lp and Ls are substantially Fourier-transform-limited pulses at the specimen A; therefore, a multiphoton excitation effect is efficiently generated by each of the pulsed laser beams Lp and Ls, allowing clear fluorescence images to be obtained. In addition, damage to the specimen due to excitation with the pulsed laser beams Lp and Ls can be suppressed to a minimum.

The laser source apparatus 1' according to this embodiment may be modified as follows.

Figure 4:
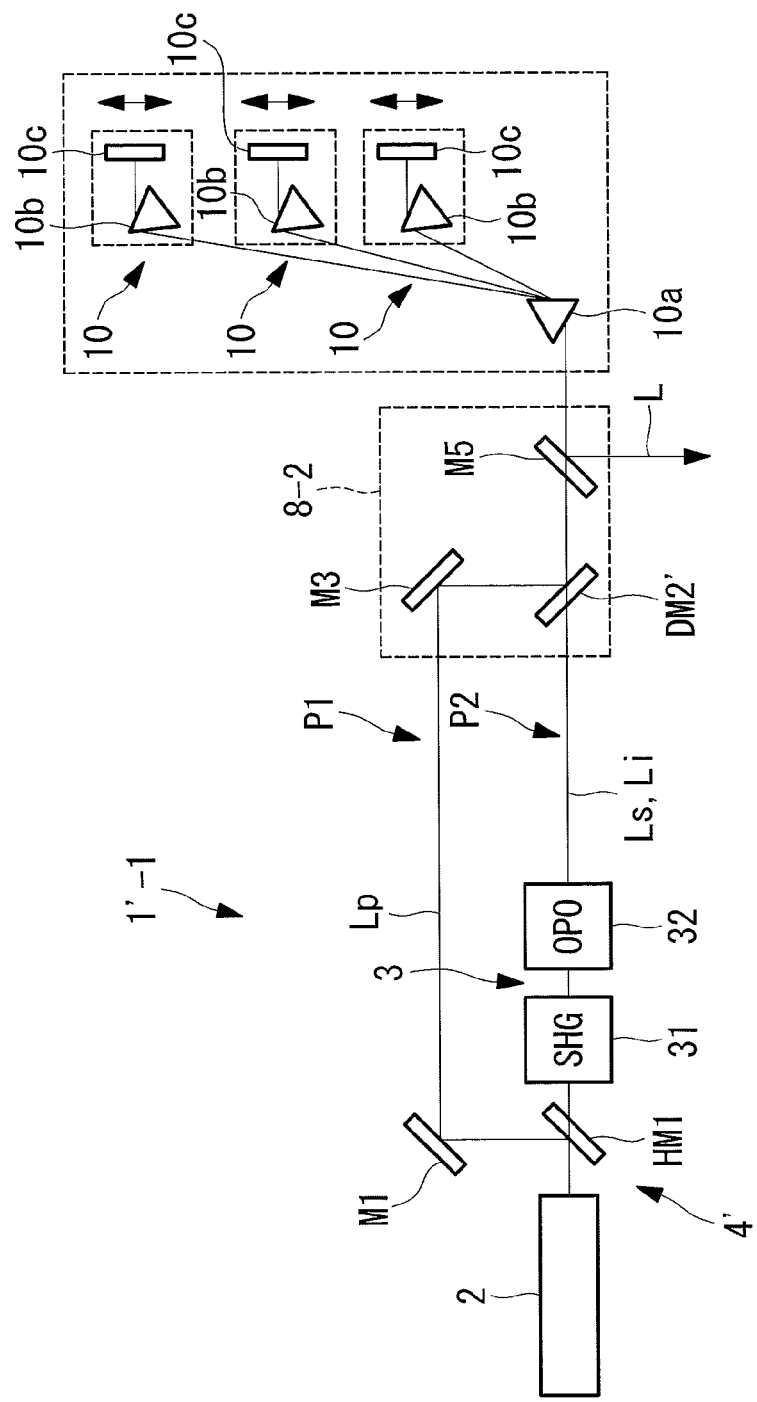
FIG. 4 is a partial configuration diagram showing a first modification of the laser source apparatus in FIG. 3.

As shown in FIG. 4, a first modification of the laser source apparatus 1' according to this embodiment is constructed so that the idler laser beam Li is also radiated together with the pump laser beam Lp and the signal laser beam Ls, to form combined light L. In other words, the cut filter 9 is omitted, and an additional dispersion-compensating optics 10 is provided. In this case, a dichroic mirror DM2' transmits both the signal laser beam Ls and the idler laser beam Li. Note that, in FIGS. 4 to 11, the power modulator 6 and the beam-shaping optics 7 are not illustrated.

Figure 5:
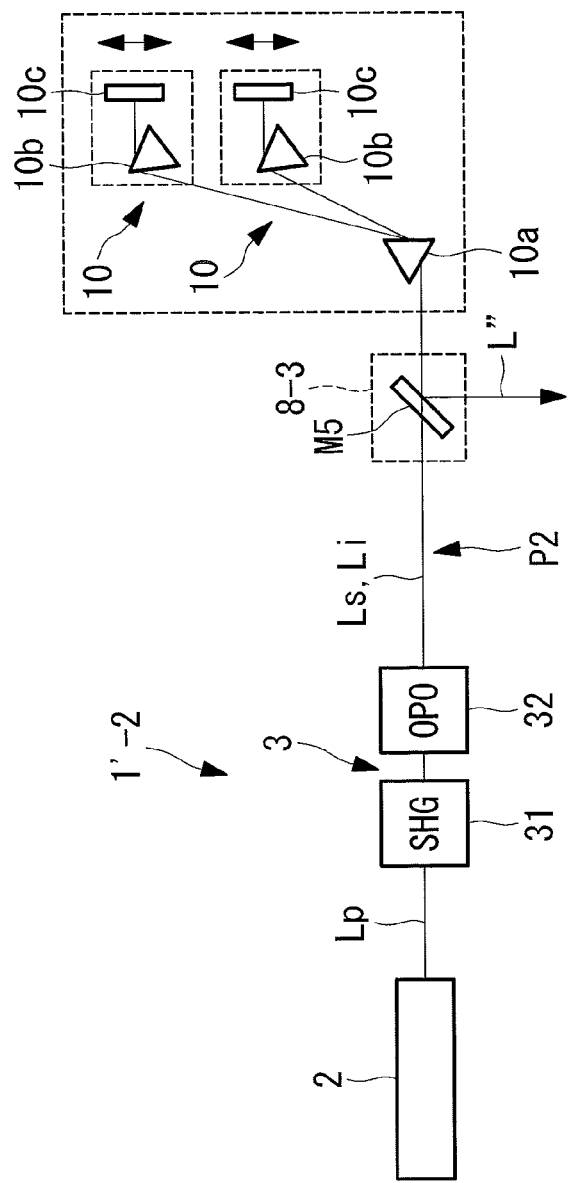
FIG. 5 is a partial configuration diagram showing a modification of the laser source apparatus in FIG. 4.

In the first modification, as shown in FIG. 5, a configuration in which the half-mirror HM1 is omitted so that only the signal laser beam Ls and the idler laser beam Li are radiated as combined light L" is also possible.

Figure 6:
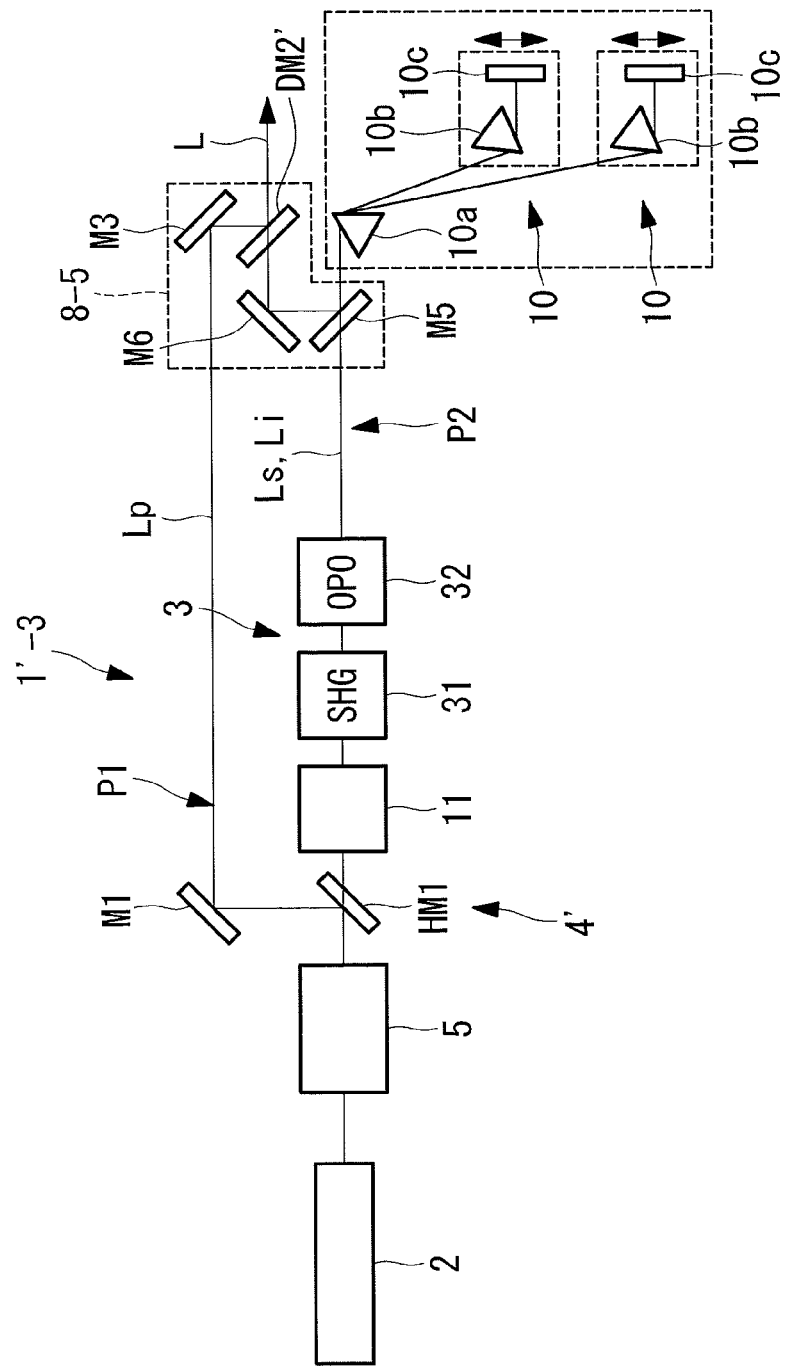
FIG. 6 is a partial configuration diagram showing another modification of the laser source apparatus in FIG. 4.

Furthermore, in the first modification, as shown in FIG. 6, a dispersion-compensating optics 5 may be provided before the half-mirror HM1 that splits off the pump laser beam Lp. The dispersion-compensating optics 5 applies negative frequency dispersion to the pump laser beam Lp in such an amount that the pump laser beam Lp becomes a substantially Fourier-transform-limited pulse at the specimen A. In this configuration, before the pump laser beam Lp that has passed through the half-mirror HM1 is incident on the SHG device 31, a positive dispersion device (dispersion adjusting section) 11 that applies positive frequency dispersion to the pump laser beam Lp so that the pump laser beam Lp becomes a substantially Fourier-transform-limited pulse at the position where it enters the SHG device 31 is provided before the SHG device 31.

Figure 7:
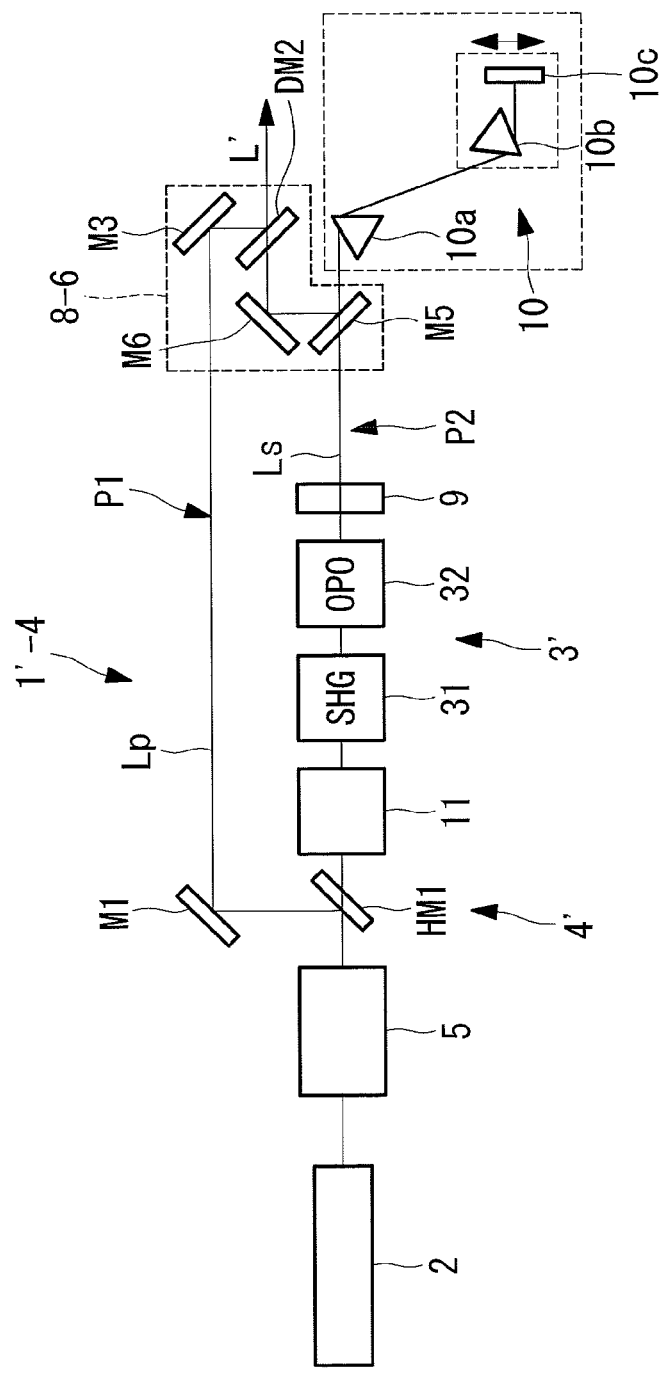
FIG. 7 is a partial configuration diagram showing a modification of the laser source apparatus in FIG. 6.

A laser source apparatus 1'-4 shown in FIG. 7, which is a modification of a laser source apparatus 1'-3 shown in FIG. 6, has a configuration in which the cut filter 9 is provided after the OPO 32 so that one of the signal laser beam Ls and the idler laser beam Li (the signal laser beam Ls in the illustrated example) is selected and combined with the pump laser beam Lp.

Figure 8:
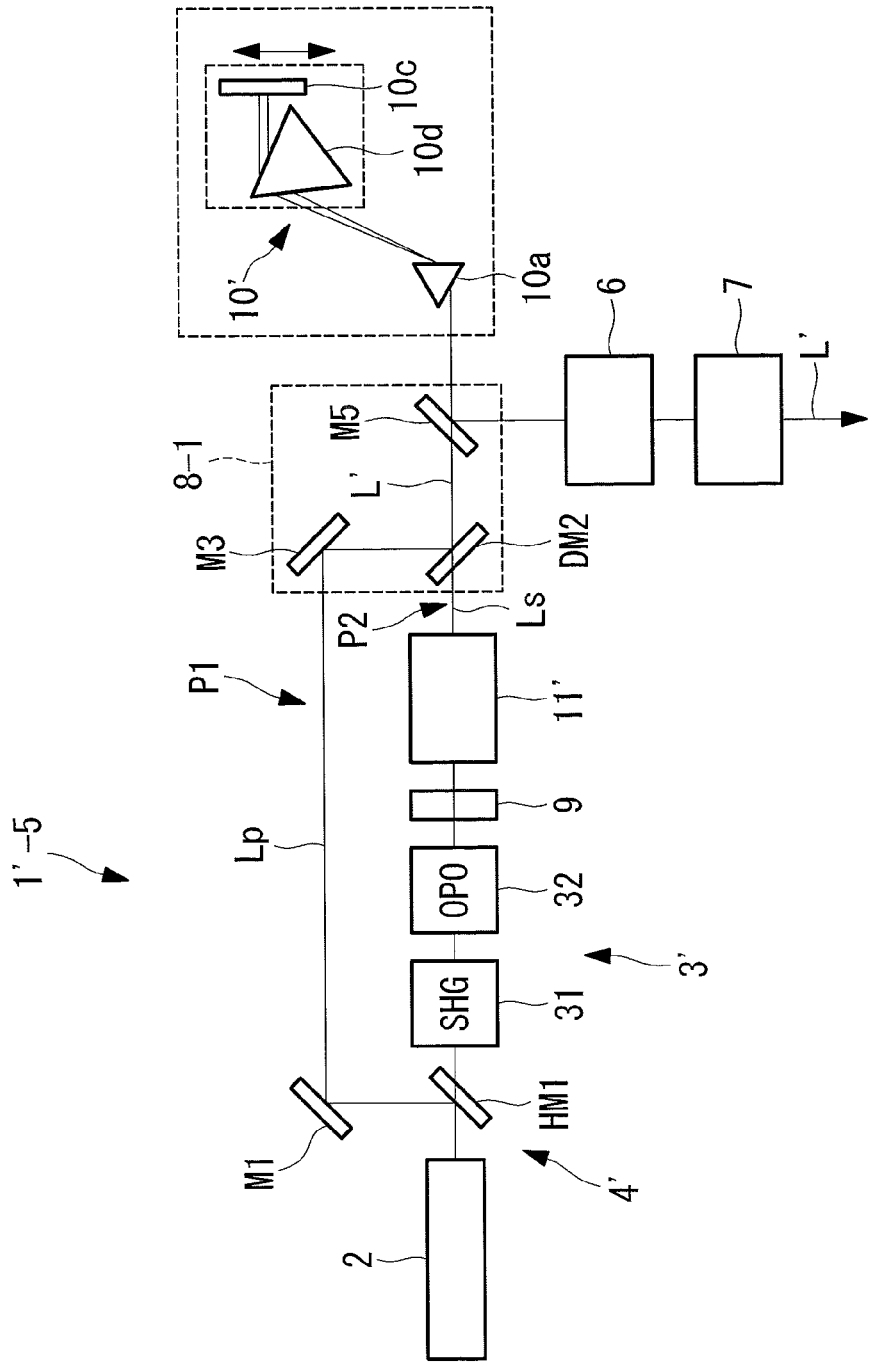
FIG. 8 is a partial configuration diagram showing a second modification of the laser source apparatus in FIG. 3.

As shown in FIG. 8, a second modification of the laser source apparatus according to this embodiment has a configuration in which a dispersion-compensating optics 10' adjusts the frequency dispersion of the pump laser beam Lp and the signal laser beam Ls using a common second prism 10d and mirror 10c. In this case, the positions of the second prism 10d and the mirror 10c are adjusted to apply negative frequency dispersion to the pump laser beam Lp and the signal laser beam Ls so that one of the pulsed laser beams (the pump laser beam Lp in the illustrated example) becomes a substantially Fourier-transform-limited pulse at the specimen A.

Here, if the wavelength of the signal laser beam Ls is longer than the wavelength of the pump laser beam Lp, a positive dispersion device (dispersion adjusting section) 11' that applies positive frequency dispersion to the signal laser beam Ls is provided after the cut filter 9, and the positive dispersion device 11' cancels out the negative frequency dispersion excessively applied to the signal laser beam Ls by the dispersion-compensating optics 10'.

Figure 9:
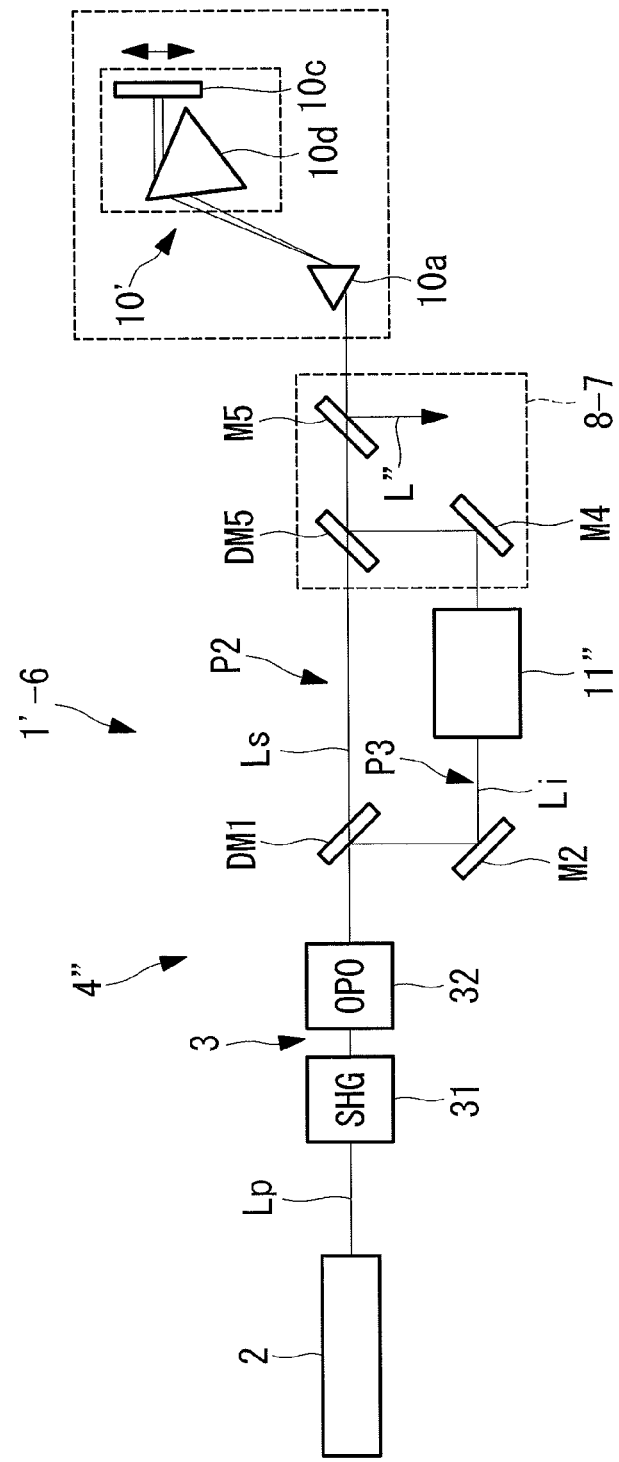
FIG. 9 is a partial configuration diagram showing a modification of the laser source apparatus in FIG. 8.

In the second modification, as shown in FIG. 9, by omitting the half-mirror HM1 and the cut filter 9, a configuration in which the idler laser beam Li, instead of the pump laser beam Lp, is radiated together with the signal laser beam Ls as combined light L" is possible. In this case also, the position of the second prism 10d is adjusted to apply negative frequency dispersion to the idler laser beam Li and the signal laser beam Ls so that one of the laser beams (the signal laser beam Ls in the illustrated example) becomes a substantially Fourier-transform-limited pulse at the specimen A.

Here, if the wavelength of the idler laser beam Li is longer than the wavelength of the signal laser beam Ls, a positive dispersion device (dispersion adjusting section) 11" that cancels out the negative frequency dispersion applied excessively to the idler laser beam Li is provided in the third light path P3.

Figure 10:
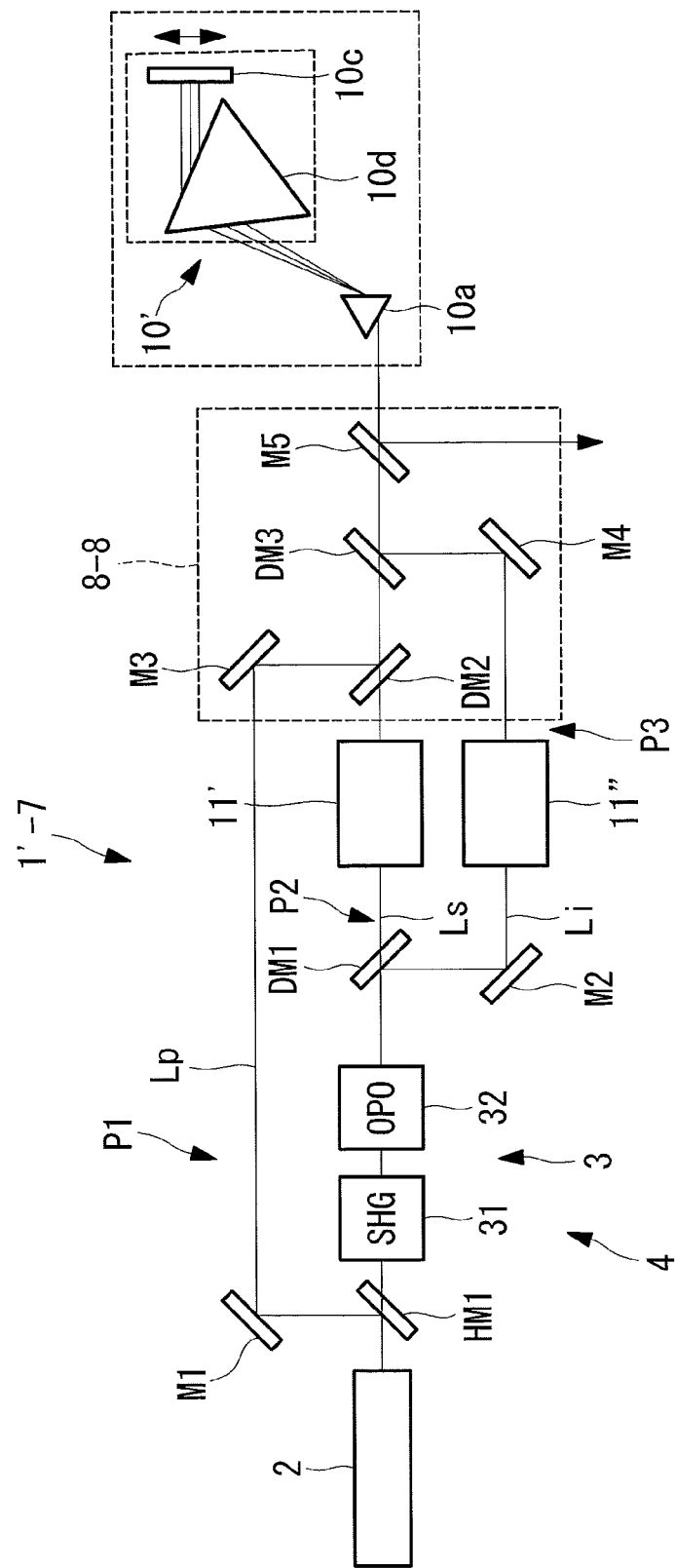
FIG. 10 is a partial configuration diagram showing another modification of the laser source apparatus in FIG. 8.

Furthermore, in the second modification, as shown in FIG. 10, a configuration in which the cut filter 9 is omitted so that the idler laser beam Li is also radiated together with the pump laser beam Lp and the signal laser beam Ls as combined light L is possible. Here, if the wavelengths of the signal laser beam Ls and the idler laser beam Li are longer than the wavelength of the pump laser beam Lp, the positive dispersion devices 11' and 11" are respectively provided in the second light path P2 and the third light path P3 to cancel out the excessive negative frequency dispersion applied to the signal laser beam Ls and the idler laser beam Li by the dispersion-compensating optics 10'.

Figure 11:
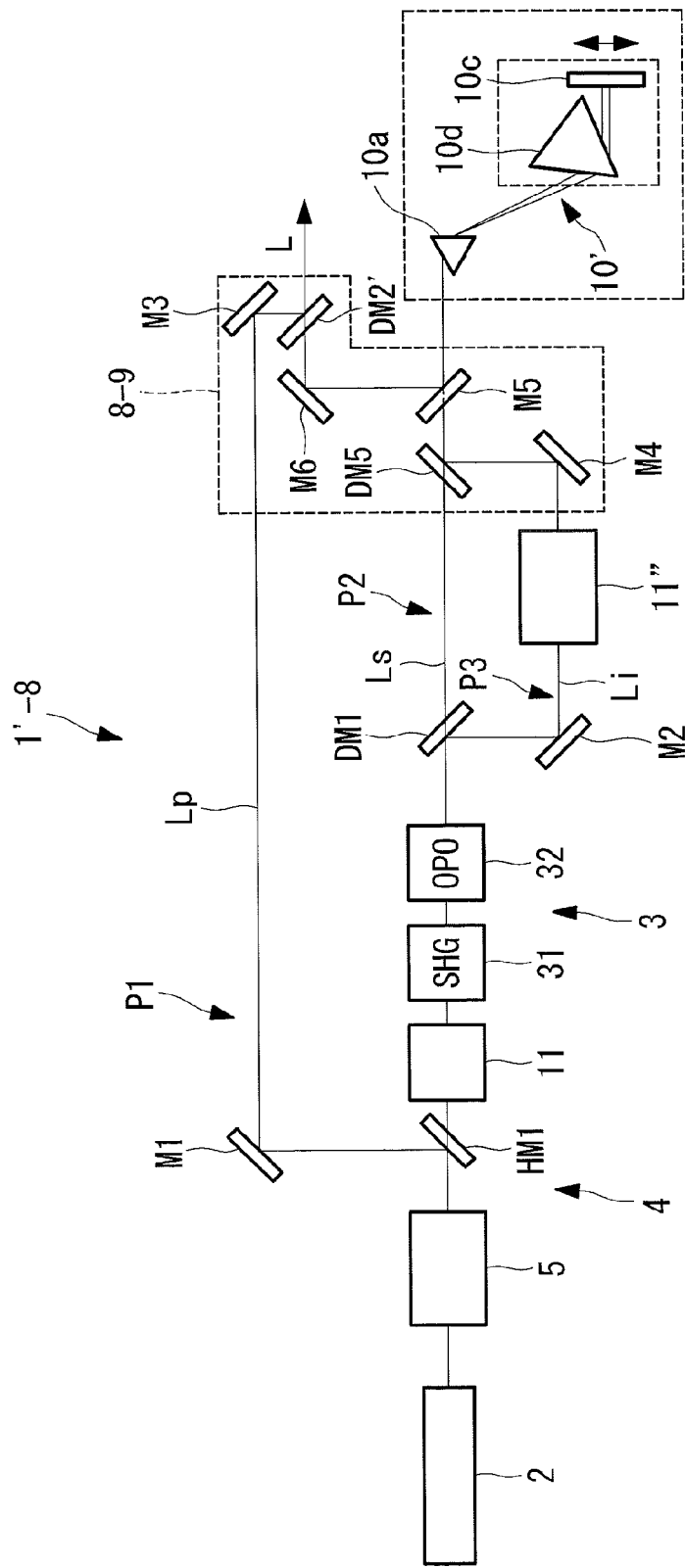
FIG. 11 is a partial configuration diagram showing a modification of the laser source apparatus in FIG. 10.

Furthermore, in the second modification, as shown in FIG. 11, a configuration in which the frequency dispersion of the pump laser beam Lp is adjusted by the dispersion-compensating optics 5 provided before the half-mirror HM1 so as to become a substantially Fourier-transform-limited pulse at the specimen A, the frequency dispersion of the signal laser beam Ls is optimally compensated for by the dispersion-compensating optics 10', and the excessive negative frequency dispersion applied to the idler laser beam Li by the dispersion-compensating optics 10' is cancelled out by the positive dispersion device 11', is also possible.

In the configurations of the above-described first and second embodiments shown in FIGS. 1, 6, 7, and 11, the combining of each pulsed laser beam may be performed in the light path between the scanner 23 and the objective lens 25 shown in FIG. 2. By doing so, two or more pulsed laser beams can be scanned at arbitrary positions on the specimen.

In addition, in the first and second embodiments, although a microscope apparatus has been illustrated as an example of the optical apparatus, the optical apparatus with which the laser source apparatus is combined is not limited thereto. The laser source apparatuses 1 and 1'-1 to 1'-8 described above can also be used in combination with other optical apparatuses that perform operations on specimens using pulsed laser beams with a plurality of wavelengths, such as laser stimulation, or various types of optical measurement, processing and so forth.

The following inventions are derived from the first and second embodiments described above and the modifications thereof.

A first aspect of the present invention is a laser source apparatus for introducing a plurality of ultrashort-pulse laser beams having different wavelengths to an optical apparatus provided with an irradiation optics that excites a specimen with the plurality of the ultrashort-pulse laser beams and that performs an operation on the specimen with the plurality of ultrashort-pulse laser beams, the laser source apparatus including a single laser source that emits an ultrashort-pulse laser beam; a wavelength conversion mechanism that generates a plurality of pulsed laser beams having different wavelengths by converting at least a part of wavelength of the ultrashort-pulse laser beam emitted from the laser source; a dispersion adjusting section that adjusts the amount of frequency dispersion for each of the pulsed laser beams generated by the wavelength conversion mechanism; and an introducing optics that emits the plurality of pulsed laser beams whose frequency dispersion amounts are adjusted by the dispersion adjusting section, wherein the dispersion adjusting section adjusts the amount of frequency dispersion for each of the pulsed laser beams so that each of the pulsed laser beams introduced to the irradiation optics of the optical apparatus from the introducing optics is close to a substantially Fourier-transform-limited pulse at the specimen.

According to the first aspect of the present invention, after the ultrashort-pulse laser beam emitted from the laser source is converted by the wavelength conversion mechanism to form a plurality of pulsed laser beams having different wavelengths, the amounts of frequency dispersion are adjusted by the dispersion adjusting section and the beams are then combined again into a single light path by the introducing optics, and the combined beam is emitted towards an irradiation optics provided in another optical apparatus. The optical apparatus performs an operation on the specimen, such as examination, measurement, laser stimulation, or processing of the specimen by irradiating the specimen with the pulsed laser beams having a plurality of wavelengths from the irradiation optics.

In this case, the pulsed laser beams entering the introducing optics each have their frequency dispersion amounts adjusted by the dispersion adjusting section, taking into account the frequency dispersion possessed by the irradiation optics, so that they are close to substantially Fourier-transform-limited pulses at the specimen. Accordingly, it is possible to generate laser beams having a plurality of wavelengths from a single laser beam, as well as to generate a multiphoton excitation effect with high efficiency due to each of the pulsed laser beams that are radiated onto the specimen from the irradiation optics.

In the first aspect described above, the wavelength conversion mechanism may include an optical parametric oscillator (OPO).

By doing so, it is possible to generate pulsed laser beams having two wavelengths from an ultrashort-pulse laser beam having a single wavelength entering the OPO.

In the first aspect described above, the dispersion adjusting section may include a prism pair, a grating pair, or chirped mirrors.

By doing so, it is possible to adjust the amount of frequency dispersion for each pulsed laser beam with a simple configuration.

The first aspect described above may further include a splitting part that splits the plurality of pulsed laser beams having different wavelengths into a plurality of light paths according to wavelength, wherein the dispersion adjusting section may include a plurality of dispersion-compensating optics provided in the respective light paths.

By doing so, it is possible to independently adjust the amount of frequency dispersion for each pulsed laser beam with the respective dispersion-compensating optics.

In the first aspect described above, the dispersion adjusting section may include a plurality of dispersion-compensating optics formed of pairs of frequency dispersion devices; and of the pairs of frequency dispersion devices, the plurality of dispersion-compensating optics may share one frequency dispersion device disposed at a front stage, the plurality of pulsed laser beams may be incident on the one frequency dispersion device, which disperses the beams, according to wavelength, to the other frequency dispersion devices, and the other frequency dispersion devices may apply negative frequency dispersion to the pulsed laser beams having single wavelengths in cooperation with the one frequency dispersion device.

By doing so, the plurality of pulsed laser beams are dispersed into each wavelength by one of the frequency dispersion devices, and the amounts of frequency dispersion of the pulsed laser beams are separately adjusted, for each wavelength, by the other frequency dispersion devices. Thus, compared with a configuration in which a plurality of pulsed laser beams are split into a separate light path for each wavelength, and a dispersion-compensating optics is provided in each light path, it is not necessary to provide the same number of light paths as the number of pulsed laser beams, and therefore, the light path configuration can be simplified.

The first aspect described above may further include a combining portion that combines the plurality of pulsed laser beams, wherein the dispersion adjusting section may include a positive dispersion device, before the combining portion, that applies positive frequency dispersion to the pulsed laser beams except for the pulsed laser beam having the shortest wavelength among the plurality of pulsed laser beams; and a single dispersion-compensating optics that applies negative frequency dispersion to the plurality of pulsed laser beams combined by the combining portion so that the pulsed laser beam having the shortest wavelength is close to a substantially Fourier-transform-limited pulse at the specimen.

In general, the amount of the frequency dispersion that an optical system applies to a pulsed laser beam depends on the wavelength of the pulsed laser beam, and the shorter the wavelength of the pulsed laser beam is, the larger the frequency dispersion received from the optical system becomes. Therefore, negative frequency dispersion for optimally compensating for the frequency dispersion of the pulsed laser beam having the shortest wavelength is applied to all of the pulsed laser beams by a single dispersion-compensating optics, and the negative frequency dispersion applied excessively to the other pulsed laser beams by the dispersion-compensating optics is cancelled out by the positive dispersion device. Thus, it is possible to use a common dispersion-compensating optics while still appropriately compensating for the frequency dispersion of a plurality of pulsed laser beams.

The first aspect described above may further include a power modulator that modulates the power of each pulsed laser beam.

Intensity variations occur in the plurality of pulsed laser beams generated from a single ultrashort-pulse laser beam. Therefore, by adjusting the power of each pulsed laser beam with the power modulator, it is possible to generate a suitable multiphoton excitation effect with any pulsed laser beam. The power modulator is preferably an acousto-optic modulator or an electro-optic modulator.

In the first aspect described above, the power modulator may turn the power of each pulsed laser beam on and off.

By doing so, it is possible to introduce the pulsed laser beams having different wavelengths to the irradiation optics in a time-division manner. Thus, when, for example, exciting a plurality of fluorescences in the specimen with a plurality of pulsed laser beams, it is possible to detect these fluorescences with a common light detector while separating them temporally.

The first aspect described above may further include a beam-shaping optics that adjusts the beam diameter and wavefront shape of each pulsed laser beam.

By doing so, the beam diameter and wavefront shape of each pulsed laser beam are adjusted by the beam-shaping optics so as to match the shape of the entrance pupil of the objective lens provided in the irradiation optics; this makes it possible to suitably introduce each pulsed laser beam to the optical apparatus.

In the first aspect described above, the wavelength conversion mechanism may include a splitting device that splits the ultrashort-pulse laser beam from the laser source into two and a wavelength conversion device that converts one of the wavelengths of the ultrashort-pulse laser beam split into two by the splitting device. In this configuration, the dispersion adjusting section may include a first dispersion-compensating optics, between the laser source and the splitting device, that adjusts the amount of frequency dispersion of the ultrashort-pulse laser beam so that the ultrashort-pulse laser beam becomes a substantially Fourier-transform-limited pulse at the specimen, a positive dispersion device, between the splitting device and the wavelength conversion device, that applies positive frequency dispersion to the ultrashort-pulse laser beam so that one of the ultrashort-pulse laser beams split by the splitting device becomes a substantially Fourier-transform-limited pulse at the position where the beam enters the wavelength conversion device, and a second dispersion-compensating optics, after the wavelength conversion device, that adjusts the amount of frequency dispersion of pulsed laser beams generated by the wavelength conversion device so that the pulsed laser beams become substantially Fourier-transform-limited pulses at the specimen.

A second aspect of the present invention is a laser microscope including any one of the above-described laser source apparatuses; and an irradiation optics to which the combined pulsed laser beams emitted from the introducing optics are introduced and which excites the specimen with the pulsed laser beams.

REFERENCE SIGNS LIST 1, 1', 1'-1 to 1'-8 laser source apparatus
2 laser source
3, 3' wavelength conversion unit (wavelength conversion mechanism)
31 second harmonic generation device
32 optical parametric oscillator (wavelength conversion device)
4, 4', 4" splitting part
5, 51 to 53 dispersion-compensating optics (dispersion adjusting section)
6, 61 to 63 power modulator
7, 71 to 73 beam-shaping optics
8, 8-1 to 8-9 introducing optics
9 cut filter
10, 10' dispersion-compensating optics (dispersion adjusting section}
10a, 10b, 10d prism (frequency dispersion device)
10c mirror
11, 11', 11" positive dispersion device (dispersion adjusting section)
20 microscope unit (optical apparatus)
22 detector
23 scanner
24 series of lens
25 objective lens
HM1 half-mirror (splitting part, splitting device)
M1 to M6 mirror
DM1 to DM5 dichroic mirror

The invention claimed is:

1. A laser source apparatus for an optical apparatus that is provided with an irradiation optics which irradiates a specimen, the laser source apparatus comprising:
a single laser source that emits an ultrashort-pulse laser beam;
a splitting device that splits the ultrashort-pulse laser beam emitted from the laser source into two first pulsed laser beams;
a wavelength conversion device that converts a wavelength of one of the two first pulsed laser beams obtained by the splitting by the splitting device, to generate at least one second pulsed laser beam having a wavelength different from the wavelength of said one first pulsed laser beam;
a first dispersion-compensating optics that is disposed in a light path of the other of the two first pulsed laser beams obtained by the splitting by the splitting device and that applies negative frequency dispersion to said other first pulsed laser beam such that said other first pulsed laser beam is close to a substantially Fourier-transform-limited pulse at the specimen, wherein a wavelength of said other first pulsed laser beam is not converted;
a second dispersion-compensating optics that is disposed in a light path of the at least one second pulsed laser beam generated by the wavelength conversion device and that applies negative frequency dispersion to the second pulsed laser beam such that the second pulsed laser beam is close to a substantially Fourier-transform-limited pulse at the specimen; and
an introducing optics that comprises a beam combining device which combines said other first pulsed laser beam to which negative frequency dispersion is applied by the first dispersion-compensating optics and the at least one second pulsed laser beam to which negative frequency dispersion is applied by the second dispersion-compensating optics, and that emits to the irradiation optics of the optical apparatus a third pulsed laser beam obtained by the combining using the beam combining device;
wherein the wavelength conversion device comprises:
a second harmonic generation device that converts said one first pulsed laser beam to generate a laser beam whose wavelength is half the wavelength of said one first pulsed laser beam and that outputs the laser beam; and
an optical parametric oscillator that generates the at least one second pulsed laser beam by converting the wavelength of the laser beam output from the second harmonic generation device.

2. The laser source apparatus according to claim 1, wherein the first dispersion-compensating optics and the second dispersion-compensating optics respectively comprise one of a prism pair, a grating pair, and chirped mirrors.

3. The laser source apparatus according to claim 1, further comprising a power modulator that modulates a power of each of said other first pulsed laser beam and the at least one second pulsed laser beam.

4. The laser source apparatus according to claim 3, wherein the power modulator comprises one of an acousto-optic modulator and an electro-optic modulator.

5. The laser source apparatus according to claim 3, wherein the power modulator turns the power of each of said other first pulsed laser beam and the at least one second pulsed laser beam on and off.

6. The laser source apparatus according to claim 3, further comprising a beam-shaping optics that adjusts a wavefront shape of each of said other first pulsed laser beam and the at least one second pulsed laser beam.

7. The laser source apparatus according to claim 3, wherein the power modulator comprises a plurality of power modulators which are respectively disposed in the light paths of said other first pulsed laser beam and the at least one second pulsed laser beam.

8. The laser source apparatus according to claim 1, further comprising a beam-shaping optics that adjusts a wavefront shape of each of said other first pulsed laser beam and the at least one second pulsed laser beam.

9. The laser source apparatus according to claim 8, wherein the beam-shaping optics comprises a plurality of beam-shaping optics which are respectively disposed in the light paths of said other first pulsed laser beam and the at least one second pulsed laser beam.

10. The laser source apparatus according to claim 1, further comprising a positive dispersion device, disposed between the splitting device and the wavelength conversion device, that applies positive frequency dispersion to said one first pulsed laser beam obtained by the splitting using the splitting device such that said one first pulsed laser beam becomes a substantially Fourier-transform-limited pulse at a position where said one first pulsed laser beam enters the wavelength conversion device.

11. The laser source apparatus according to claim 1, wherein the splitting device is a half-mirror.

12. The laser source apparatus according to claim 1, wherein the beam combining device includes a dichroic mirror.

13. A laser source apparatus for an optical apparatus that is provided with an irradiation optics which irradiates a specimen, the laser source apparatus comprising:
 a single laser source that emits an ultrashort-pulse laser beam;
 a splitting device that splits the ultrashort-pulse laser beam emitted from the laser source into two first pulsed laser beams;
 a wavelength conversion device that converts a wavelength of one of the two first pulsed laser beams obtained by the splitting by the splitting device, to generate at least one second pulsed laser beam having a wavelength different from the wavelength of said one first pulsed laser beam;
 a first dispersion-compensating optics that is disposed in a light path of the other of the two first pulsed laser beams obtained by the splitting by the splitting device and that applies negative frequency dispersion to said other first pulsed laser beam such that said other first pulsed laser beam is close to a substantially Fourier-transform-limited pulse at the specimen, wherein a wavelength of said other first pulsed laser beam is not converted;
 a second dispersion-compensating optics that is disposed in a light path of the at least one second pulsed laser beam generated by the wavelength conversion device and that applies negative frequency dispersion to the second pulsed laser beam such that the second pulsed laser beam is close to a substantially Fourier-transform-limited pulse at the specimen;
 an introducing optics that comprises a beam combining device which combines said other first pulsed laser beam to which negative frequency dispersion is applied by the first dispersion-compensating optics and the at least one second pulsed laser beam to which negative frequency dispersion is applied by the second dispersion-compensating optics, and that emits to the irradiation optics of the optical apparatus a third pulsed laser beam obtained by the combining using the beam combining device;
 wherein:
 the wavelength conversion device generates a plurality of the second pulsed laser beams, the plurality of second pulsed laser beams having different wavelengths;
 the wavelength conversion device comprises an optical parametric oscillator that generates a signal laser beam and an idler laser beam as the plurality of the second pulsed laser beams having different wavelengths;
 the laser source apparatus further comprises a second splitting device that splits the plurality of second pulsed laser beams into a plurality of light paths according to wavelength, the second splitting device splitting the signal laser beam and the idler laser beam into different light paths among the plurality of light paths;
 the second dispersion-compensating optics comprises a plurality of second dispersion-compensating optics which are respectively disposed in the plurality of light paths;
 the beam combining device of the introducing optics combines the signal laser beam and the idler laser beam to which negative frequency dispersion is individually applied by the plurality of second dispersion-compensating optics; and
 the third pulsed laser beam includes (i) said other first pulsed laser beam having the wavelength which is the same as a wavelength of the ultrashort-pulse laser beam emitted from the single laser source and (ii) the plurality of second pulsed laser beams comprising the signal laser beam and the idler laser beam which are generated by the optical parametric oscillator.

14. A laser microscope that irradiates a specimen with ultrashort-pulse laser beams having different wavelengths, the laser microscope comprising:
 a laser source apparatus that comprises:
  a single laser source that emits an ultrashort-pulse laser beam;
  a wavelength conversion mechanism that generates a plurality of pulsed laser beams having different wavelengths by converting a wavelength of at least a part of the ultrashort-pulse laser beam emitted from the laser source, the wavelength conversion mechanism comprising an optical parametric oscillator which generates a signal laser beam and an idler laser beam, the different wavelengths including a wavelength of the signal laser beam and a wavelength of the idler laser beam;
  a beam splitter that splits the plurality of pulsed laser beams which are output from the wavelength conversion mechanism into a plurality of individual light paths according to wavelength, the wavelengths of the plurality of pulsed laser beams being different from the wavelength of the ultrashort-pulse laser beam emitted from the laser source, the beam splitter splitting the signal laser beam and the idler laser beam into the plurality of individual light paths;

a dispersion adjusting section that applies negative frequency dispersion to each of the pulsed laser beams generated by the wavelength conversion mechanism to adjust an amount of frequency dispersion for each of the pulsed laser beams, the dispersion adjusting section being configured to adjust the amount of frequency dispersion independently for each of the pulsed laser beams, the dispersion adjusting section comprising a plurality of dispersion-compensating optics that are individually disposed in the plurality of individual light paths; and an introducing optics that emits the plurality of pulsed laser beams whose frequency dispersion amounts are adjusted by the dispersion adjusting section, the introducing optics comprising a beam combiner that combines the plurality of individual light paths, an irradiation optics to which the plurality of pulsed laser beams emitted from the introducing optics of the laser source apparatus are introduced, the irradiation optics comprising an objective lens and focusing and irradiating the plurality of pulsed laser beams onto the specimen via the objective lens; and a detection optics that detects fluorescences caused by a multiphoton excitation effect generated by the irradiating by the irradiation optics, the fluorescences being collected by the objective lens, wherein the dispersion adjusting section adjusts the amount of frequency dispersion for each of the pulsed laser beams such that each of the pulsed laser beams introduced to the irradiation optics from the introducing optics is close to a substantially Fourier-transform-limited pulse at the specimen.

15. The laser microscope according to claim 14,
wherein the laser source apparatus further comprises a power modulator that controls output of each of the pulsed laser beams, and
wherein the irradiation optics comprises a scanner that scans the plurality of pulsed laser beams emitted from the introducing optics.

16. The laser microscope according to claim 15, wherein the power modulator switches a beam to be output from among the pulsed laser beams in synchronization with a scanning period of the scanner.

17. The laser microscope according to claim 15, further comprising a beam-shaping optics that adjusts a wavefront shape of each of the pulsed laser beams.

18. The laser microscope according to claim 14, wherein the wavelength conversion mechanism further comprises a second harmonic generation device that is disposed between the single laser source and the optical parametric oscillator and that converts the ultrashort-pulse laser beam emitted from the single laser source to generate a laser beam whose wavelength is half the wavelength of the ultrashort-pulse laser beam emitted from the single laser source.

19. A laser microscope that irradiates a specimen with ultrashort-pulse laser beams having different wavelengths, the laser microscope comprising:
a single laser source that emits an ultrashort-pulse laser beam;
a splitting device that splits the ultrashort-pulse laser beam emitted from the laser source into two first pulsed laser beams;

a wavelength conversion device that converts a wavelength of one of the two first pulsed laser beams obtained by the splitting by the splitting device to generate at least one second pulsed laser beam having a wavelength different from the wavelength of said one first pulsed laser beam;

a first dispersion-compensating optics that is disposed in a light path of the other of the two first pulsed laser beams obtained by the splitting by the splitting device and that applies negative frequency dispersion to said other first pulsed laser beam such that said other first pulsed laser beam is close to a substantially Fourier-transform-limited pulse at the specimen, wherein a wavelength of said other first pulsed laser beam is not converted;

a second dispersion-compensating optics that is disposed in a light path of the at least one second pulsed laser beam generated by the wavelength conversion device and that applies negative frequency dispersion to the second converted pulsed laser beam such that the second pulsed laser beam is close to a substantially Fourier-transform-limited pulse at the specimen;

an introducing optics that comprises a beam combining device which combines said other first pulsed laser beam to which negative frequency dispersion is applied by the first dispersion-compensating optics and the at least one second pulsed laser beam to which negative frequency dispersion is applied by the second dispersion-compensating optics, and that emits a third pulsed laser beam obtained by the combining using the beam combining device as combined light;

an irradiation optics to which the combined light emitted from the introducing optics is introduced, the irradiation optics comprising an objective lens and focusing and irradiating the combined light onto the specimen via the objective lens; and a detection optics that detects fluorescences caused by a multiphoton excitation effect generated by the irradiating by the irradiation optics, the fluorescences being collected by the objective lens;

wherein the wavelength conversion device comprises:
a second harmonic generation device that converts said one first pulsed laser beam to generate a laser beam whose wavelength is half the wavelength of said one first pulsed laser beam and that outputs the laser beam; and
an optical parametric oscillator that generates the at least one second pulsed laser beam by converting the wavelength of the laser beam output from the second harmonic generation device.

20. The laser microscope according to claim 19, further comprising power modulators that are disposed in the light paths of each of said other first pulsed laser beam and the at least one second pulsed laser beam, and that control output of each of said other first pulsed laser beam and the at least one second pulsed laser beam to which negative frequency dispersion is applied,
wherein the irradiation optics comprises a scanner that scans the combined light emitted from the introducing optics.

21. The laser microscope according to claim 20, wherein the power modulators switch a beam to be output from among said other first pulsed laser beam and the at least one second pulsed laser beam in synchronization with a scanning period of the scanner.

22. The laser microscope according to claim 20, further comprising a beam-shaping optics that adjusts a wavefront shape of each of said other first pulsed laser beam and the at least one second pulsed laser beam.

23. A laser microscope that irradiates a specimen with ultrashort-pulse laser beams having different wavelengths, the laser microscope comprising:
- a single laser source that emits an ultrashort-pulse laser beam;
- a splitting device that splits the ultrashort-pulse laser beam emitted from the laser source into two first pulsed laser beams;
- a wavelength conversion device that converts a wavelength of one of the two first pulsed laser beams obtained by the splitting by the splitting device to generate at least one second pulsed laser beam having a wavelength different from the wavelength of said one first pulsed laser beam;
- a first dispersion-compensating optics that is disposed in a light path of the other of the two first pulsed laser beams obtained by the splitting by the splitting device and that applies negative frequency dispersion to said other first pulsed laser beam such that said other first pulsed laser beam is close to a substantially Fourier-transform-limited pulse at the specimen, wherein a wavelength of said other first pulsed laser beam is not converted;
- a second dispersion-compensating optics that is disposed in a light path of the at least one second pulsed laser beam generated by the wavelength conversion device and that applies negative frequency dispersion to the second converted pulsed laser beam such that the second pulsed laser beam is close to a substantially Fourier-transform-limited pulse at the specimen;
- an introducing optics that comprises a beam combining device which combines said other first pulsed laser beam to which negative frequency dispersion is applied by the first dispersion-compensating optics and the at least one second pulsed laser beam to which negative frequency dispersion is applied by the second dispersion-compensating optics, and that emits a third pulsed laser beam obtained by the combining using the beam combining device as combined light;
- an irradiation optics to which the combined light emitted from the introducing optics is introduced, the irradiation optics comprising an objective lens and focusing and irradiating the combined light onto the specimen via the objective lens;
- a detection optics that detects fluorescences caused by a multiphoton excitation effect generated by the irradiating by the irradiation optics, the fluorescences being collected by the objective lens;

wherein:
- the wavelength conversion device generates a plurality of the second pulsed laser beams, the plurality of second pulsed laser beams having different wavelengths,
- the wavelength conversion device comprises an optical parametric oscillator that generates a signal laser beam and an idler laser beam as the plurality of the second pulsed laser beams having different wavelengths;
- the laser microscope further comprises a second splitting device that splits the signal laser beam and the idler laser beam into a plurality of light paths;
- the second dispersion-compensating optics comprises a plurality of second dispersion-compensating optics which are respectively disposed in the plurality of light paths;
- the beam combining device of the introducing optics combines the signal laser beam and the idler laser beam to which negative frequency dispersion is individually applied by the plurality of second dispersion-compensating optics; and
- the third pulsed laser beam includes (i) said other first pulsed laser beam having the wavelength which is the same as a wavelength of the ultrashort-pulse laser beam emitted from the single laser source and (ii) the plurality of second pulsed laser beams comprising the signal laser beam and the idler laser beam which are generated by the optical parametric oscillator.

\* \* \* \* \*